United States Patent [19]

Harston et al.

[11] 4,430,147

[45] Feb. 7, 1984

[54] HOT MELT ADHESIVE APPLICATORS

[75] Inventors: John C. Harston; William E. Hampton, both of Clevedon, England

[73] Assignee: Kliklok Corporation, Greenwich, Conn.

[21] Appl. No.: 411,999

[22] Filed: Aug. 27, 1982

[30] Foreign Application Priority Data

Sep. 3, 1981 [GB] United Kingdom ................. 8126723

[51] Int. Cl.³ ............................................. B32B 31/00

[52] U.S. Cl. .................................... 156/578; 118/259; 118/694

[58] Field of Search ........................ 156/578, 378, 356; 118/693, 694, 258, 259, 261, 110, 112

[56] References Cited

U.S. PATENT DOCUMENTS

| | | | |
|---|---|---|---|
| 1,023,569 | 4/1912 | Juengst | 412/37 |
| 3,023,726 | 3/1962 | Kamborian | 118/694 |
| 3,063,408 | 11/1962 | Gustafson et al. | 118/258 |
| 3,340,849 | 9/1967 | Adams et al. | 118/259 X |
| 3,352,279 | 11/1967 | Lockwood | 118/694 |
| 3,592,159 | 7/1971 | Murphy | 118/694 |
| 3,634,995 | 1/1972 | Curtis | 156/694 |
| 3,792,801 | 2/1974 | Baker et al. | 219/398 X |
| 3,863,596 | 2/1975 | Anderson | 118/238 X |
| 3,911,161 | 10/1975 | Nord et al. | 427/422 X |
| 4,117,800 | 10/1978 | Maus et al. | 118/694 |
| 4,246,868 | 1/1981 | Brown et al. | 118/694 |
| 4,256,526 | 3/1981 | McDaniel | 156/295 |

*Primary Examiner*—David A. Simmons

*Attorney, Agent, or Firm*—King and Liles

[57] ABSTRACT

A hot melt adhesive applicator comprises an enclosed wheel glue pot (2) the sides (3, 4, 5) of which fit closely to the sides of the applicator wheel (6), a doctor blade (7) preceding the applicator wheel, an anti-stringout wheel (8) following the applicator wheel, a remote tank (9) forming a reservoir for adhesive, a flexible hose (10) from the tank (9) to the glue pot (2), a pump (11) for feeding adhesive from the tank (9) through the hose (10), heating means for the tank and hose and glue pot, passages (12A, 12B, 13-FIGS. 3 and 6) in one side (5) of the glue pot (2) for feeding adhesive from the hose (10) to a pool (14) between the underside of the doctor blade (7) and the periphery of the applicator wheel (6), and switch means (15) for actuating the pump (11), there also being provided a chamber (16) between the hose (10) and the passages (12A, 12B, 13) in the glue pot (6), with an inlet (17) from the hose (10) and an outlet (18) to the passages (12A, 12B, 13) in the glue pot (2), and adhesive level sensing means (19) in the chamber (16) adapted to operate the switch means (15) when the adhesive level (L) in the chamber (16) falls below a predetermined level.

8 Claims, 11 Drawing Figures

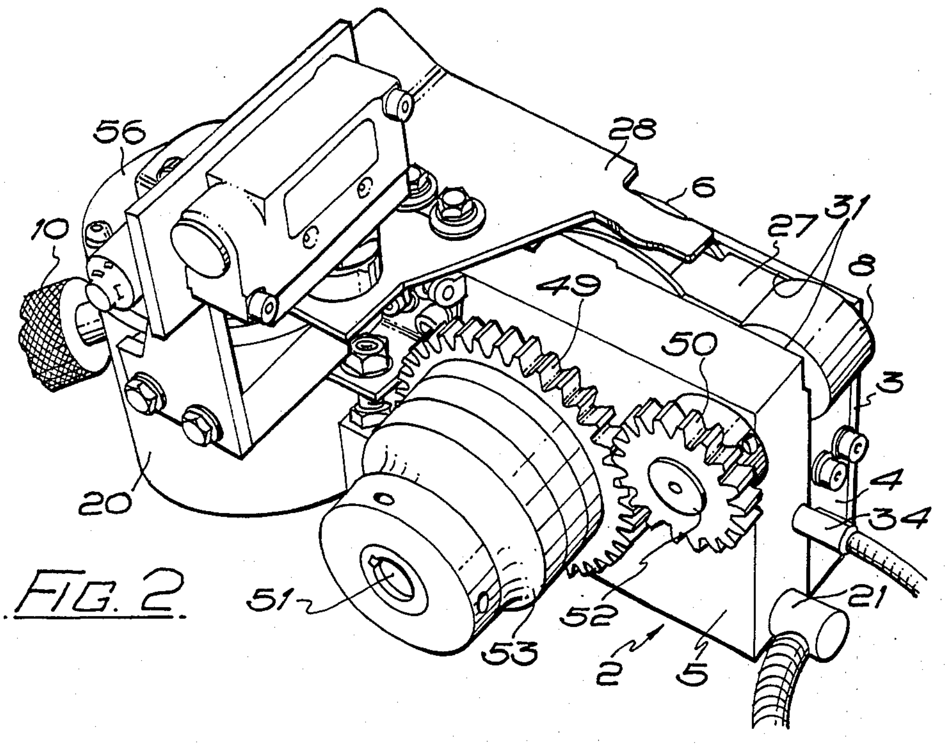
FIG. 2
FIG. 4
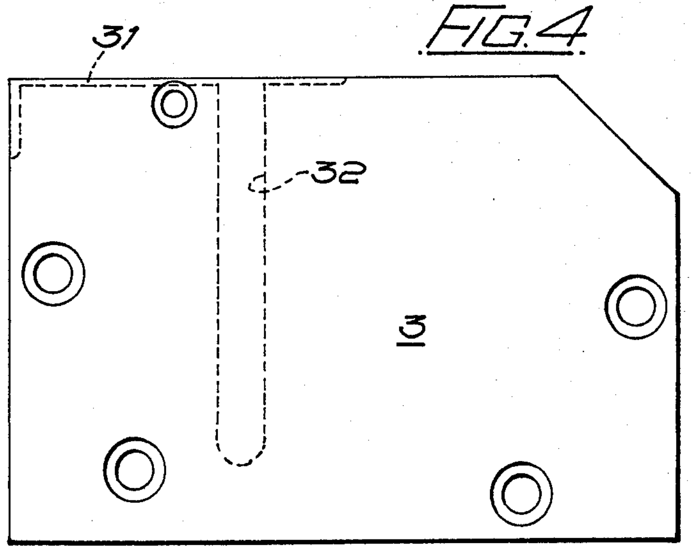

HOT MELT ADHESIVE APPLICATORS

FIELD OF THE INVENTION

This invention relates to hot melt adhesive applicators for use in packaging machinery in which the adhesive is applied to flaps of cardboard boxes or cartons just before closure.

BACKGROUND OF THE INVENTION

The simplest form of hot melt adhesive applicator has an open "glue pot" housing a wheel for effecting the application and an adjacent reservoir or "tank" maintaining the requisite level of adhesive in the glue pot, which along with the tank is heated electrically, to melt adhesive put in the tank and raise it to the required temperature in the glue pot. The applicator wheel is usually preceded by a doctor blade controlling the spread and thickness of adhesive, and is usually followed by an anti-stringout wheel contrarotating with respect to the applicator wheel so as to return to the glue pot any adhesive "strings" trailing from a flap that has passed over the applicator wheel. Although this form of hot melt adhesive applicator is highly suited to the accurate application of a wide variety of adhesives, it suffers from a number of disadvantages such as poor temperature control because of the volume in the glue pot, risk of degradation of the adhesive, contamination due to the open pot, and difficulty with replenishing the tank because it lies with the glue pot within the normally guarded regions of the packaging machinery. The glue pot can be provided with a cover (the tank invariably has one) but the need for openings for the applicator wheel and the anti-stringout wheel makes for difficulty in effecting adjustments to the position of the applicator wheel.

Remote supply systems are also known in a variety of forms.

Firstly, an enclosed wheel glue pot in which the sides of the pot fit closely to the sides of the applicator wheel and the adhesive is pumped from a remote tank through a flexible heated hose and passages in one side of the glue pot to a pool between the underside of the doctor blade and the periphery of the applicator wheel. The pump is controlled by sensing either the temperature or the pressure of the adhesive in the pool; in either case the control is complex and therefore liable to variation of the condition of the adhesive on the applicator wheel, and in the latter case high pressure flexible hose is required from the tank to the glue pot.

Secondly, jetting of the adhesive through a nozzle instead of application by a wheel in a glue pot. Although replenishment is easy and temperature control at the nozzle is good, this system is limited as to the types of adhesive which can be used, particularly because degradation can takeplace at the nozzle, and any contamination is likely to block the nozzle, but its particular disadvantage is that the nozzle must be controlled by a valve operated in response to a box or carton sensor, which is complex and very variable in accuracy.

Another system that has been tried but with limited success is one in which solid rod adhesive is mechanically fed to an enclosed wheel glue pot, the big disadvantage being that the heater in the glue pot has to effect melting of the adhesive and raise it to the required temperature at the wheel within a very short time and distance. This has proved practical with only one type of adhesive specifically formulated for the purpose; consequently, a number of installations have been converted to the remote supply type.

OBJECT OF THE INVENTION

The object of the present invention is to provide a hot melt adhesive applicator whioh is capable of optimising the following six parameters:

1. Wide variety of adhesive types.
2. Good temperature control.
3. Low risk of degradation of the adhesive.
4. Minimal contamination.
5. Ease of replenishment of the adhesive.
6. Good control of accuracy of application.

DESCRIPTION OF THE INVENTION

According to the present invention, a hot melt adhesive applicator comprises an enclosed wheel glue pot the sides of which fit closely to the sides of the applicator wheel, a doctor blade preceding the applicator wheel, an anti-stringout wheel following the applicator wheel, a remote tank forming a reservoir for adhesive, a flexible hose from the tank to the glue pot, a pump for feeding adhesive from the tank through the hose, heating means for the tank and hose and glue pot, passages in one side of the glue pot for feeding adhesive from the hose to a pool between the underside of the doctor blade and the periphery of the applicator wheel, and switch means for actuating the pump, there also being provided a chamber between the hose and the passages, in the glue pot, with an inlet from the hose and an outlet to the passages in the glue pot, and adhesive level sensing means in the chamber adapted to operate the switch means when the adhesive level in the chamber falls below a predetermined level.

The invention enables a wide variety of adhesive types to be used in the one form of applicator, because the adhesive can be brought gradually to the required temperature at the applicator wheel. The flexible hose is not required to withstand any appreciable pressure, because the adhesive level sensing means and the pump actuated thereby through the switch means maintains the flow of adhesive without pressurising it, and this, coupled with good temperature control attainable with the individual heating means for the tank and hose and glue pot, results in a very low risk of degradation of the adhesive. Contamination is minimised by the use of an enclosed wheel glue pot and a remote tank, which latter also makes for ease of replenishment of the adhesive. Good control of accuracy of application is facilitated by moving the chamber with the glue pot to adjust the position of the applicator wheel.

The chamber is conveniently provided in a body contiguous with the glue pot, so that in addition to being readily movable with the glue pot the body can receive heat from the glue pot heating means rather than have its own heating means. The outlet from the chamber to the passages in the glue pot is preferably disposed appreciably above the bottom of the chamber, so as to form a sump portion in which any (slight) contamination can settle. A return or relief port is preferably provided between the pool in the glue pot and the chamber, above the highest level of adhesive in it, to ensure that there will be no pressure build-up in the pool when the applicator wheel is turning but not contacted by any box or carton flaps for any lengthy period; and the return or relief port also allows any (slight) contamination in the pool to pass into the chamber and settle in the sump portion, which can be readily cleaned out during normal down-time of the applicator.

The adhesive level sensing means may be a float with a diametral hole by which the float is guided on a tube depending from a removable cover for the chamber, and in which tube is located a proximity switch (e.g., a reed switch) operated by the float and connected to the pump. Alternatively, the float may be mounted on one arm of a lever the other arm of which lies outside the chamber (and preferably in a separate housing or shroud) and carries a flag movable in relation to an inductive proximity switch in response to the movement of the float, which switch is connected to the pump.

Alternatively, to avoid moving parts in the chamber and which may be retarded by adhesive settling thereon, the adhesive level sensing means may be a field sensor probe with one end in the chamber, the other end of the probe being connected outside the chamber (and preferably through a non- metallic heat shield) by a wire to a metal field transfer plate adjacent to a capacative proximity switch connected to the pump (which switch is preferably in a separate housing or shroud).

Again, avoiding moving parts in the chamber, the adhesive level sensing means may be a pressure sensor probe having a dip tube extending into the chamber, with a low pressure and flow air supply to the dip tube and to one side of the diaphragm of a pressure amplifier, and with a sensor port of the pressure sensor probe connected to the other side of the diaphragm, movement of which is caused to actuate a switch connected to the pump.

DETAILED DESCRIPTION OF EMBODIMENT

An embodiment of the invention and modifications thereof will now be described, by way of example only, with reference to the accompanying drawings, in which:

FIG. 2 is a detailed perspective view of the farther of the applicator wheel glue pot assemblies shown in FIG. 1 as seen from above and the other side;

FIGS. 4, 5 and 6 are respective detailed elevations of the three main plates forming the glue pot of the assembly shown in FIGS. 2 and 3 as seen from the same side as FIG. 3;

Figure 1:
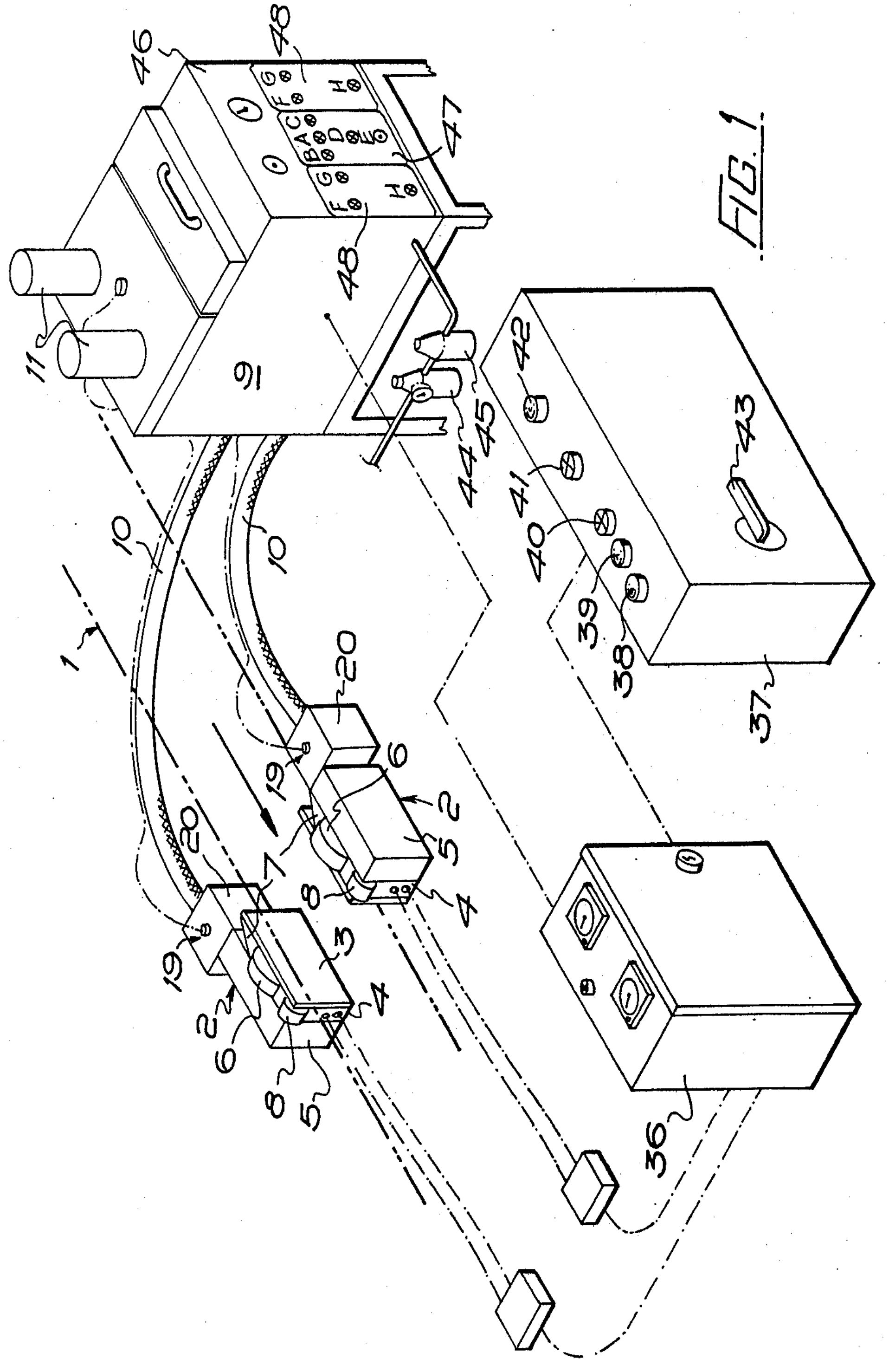
FIG. 1 is a diagrammatic representation of a hot melt adhesive applicator in accordance with the invention having two applicator wheels for use one on each side of a carton closure line.

The hot melt adhesive applicator shown diagrammatically in FIG. 1 comprises, on each side of a carton closure line 1 (indicated merely by double-dotted chain dotted lines), an enclosed wheel glue pot 2 the sides 3, 4, 5 of which (see also FIGS. 2 to 6) fit closely to the sides of the applicator wheel 6, a doctor blade 7 preceding the applicator wheel, an anti-stringout wheel 8 following the applicator wheel, a remote tank 9 forming a reservoir for adhesive, a flexible hose 10 from the tank to the glue pot, a pump 11 for feeding adhesive from the tank through the hose, heating means for the tank and hose and glue pot (to be referred to later), passages 12A, 12B and 13 in one side 5 of the glue pot 2 for feeding adhesive from the hose 10 to a pool 14 between the underside of the doctor blade 7 and the periphery of the applicator wheel, and switch means 15 for actuating the pump 11, there also being provided a chamber 16 between the hose 10 and the glue pot 2, with an inlet 17 from the hose and an outlet 18 to the passages 12, 13 in the glue pot, and adhesive level sensing means 19 in the chamber 16 adapted to operate the switch means when the adhesive level in the chamber falls below a predetermined level.

The chamber 16 is provided in a body 20 contiguous with the glue pot 2, so that in addition to being readily movable with the glue pot (for adjustment of the position of the applicator wheel 6 in relation to the carton closure line 1) the body can receive heat from the glue pot heating means, which consists of a cartridge heater 21 in a bore 22 in the side plate 5. The outlet 18 from the chamber to the passages 12A, 12B and 13 in the glue pot is disposed appreciably above the bottom of the chamber, so as to form a sump portion 23 in which any (slight) contamination can settle. A return or relief port 24A, 24B is provided between the pool 14 in the glue pot and the chamber, above the highest level L of adhesive in it, to ensure that there will be no pressure build-up in the pool when the applicator wheel 6 is turning but not contacted by any carton flaps for any lengthy period; and the return or relief port also allows any (slight) contamination in the pool to pass into the float chamber and settle in the sump portion, which can be readily cleaned out during normal down-time of the applicator. However, because any contamination of the adhesive will be very slight it is feasible to connect the sump portion 23 to the main tank 9, by a flexible heated hose 25 from an outlet 26 (and shown in FIG. 3 only), whereby some recirculation of adhesive is possible without risk of degradation. Contamination is minimised by the close confinement of the applicator wheel 6 within the glue pot 2 and the provision of an infill guide 27 (FIG. 3 only) between the applicator wheel and the anti-stringout wheel 8 (and below the end of an upper flap guide 28 which with a lower flap guide 29 is supported by a bracket 30), but the upper edges of the faces of the side plates 3 and 5 adjacent the wheels 6, 8 are relieved as shown at 31 to discourage any tendency for adhesive to flow on to the top surfaces of these side plates. Shallow grooves 32 in the aforementioned faces of the side plates 3 and 5 encourage flow of adhesive from the relieved edges 31 to the lower regions of the applicator wheel 6, while a blade 33 (FIG. 3 only) directs adhesive from the periphery of the anti-stringout wheel 8 in the same general direction.

The temperature of each glue pot 2 (and chamber 16) is sensed by a thermocouple 34 in a bore 35 in the side plate 5, and is monitored by a control box 36, but all the heaters for the main tank 9, the hoses 10 and the glue pots (i.e., the cartridge heaters 21) are operated from a central console 37 having "ON" and "OFF" switches 38, 39 respectively and indicator light 40, a "READY TO RUN" indicator 41, a "RUN" switch 42 and a mains isolator 43. The pumps 11 are operated by mains air supplied through regulators 44, 45 and the main tank has an air control and indicator panel 46, a main tank indicator panel 47 with power indicator A, base and side heater indicators B, C respectively, low level warning light D and over-ride time E reset manually or by the machine "RUN" switch, and two applicator assembly indicator panels 48 each with hose heater indicator F, pump indicator G and low level warning light H.

FIG. 2 shows intermeshing spur gears 49, 50 on shafts 51, 52 respectively carrying the applicator wheel 6 and anti-stringout wheel 8 respectively (see also FIG. 3), and when the glue pot assembly 2 is mounted alongside the carton closure line 1 the gear 49 meshes with a drive gear (not shown) to cause rotation of the applicator wheel with a peripheral speed equal to the linear speed of the cartons. A detent clutch 53 is provided between the gear 49 and the shaft 51.

Figure 3:
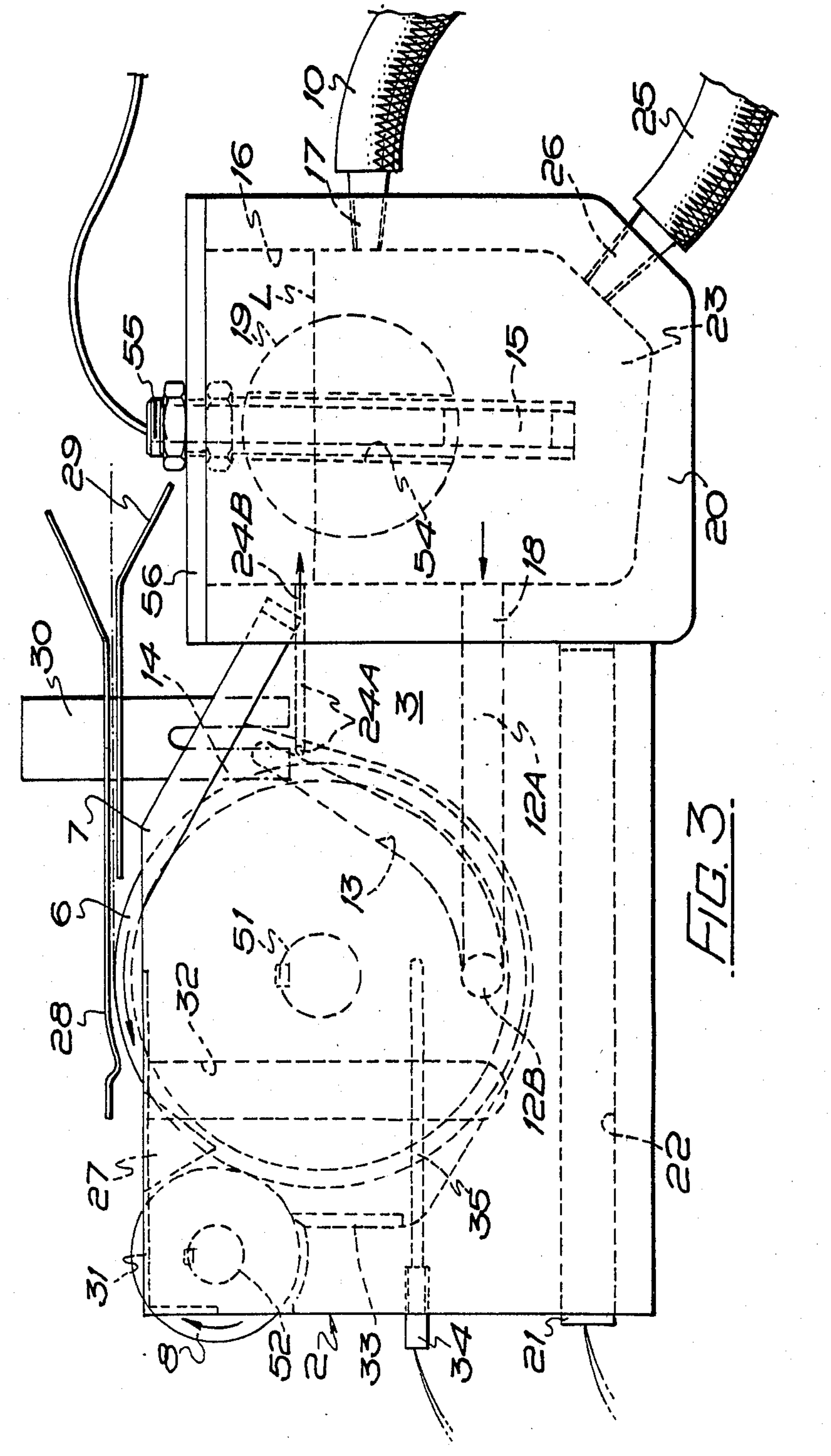
FIG. 3 is a simplified elevation of the applicator wheel assembly shown in FIG. 2 taken from the opposite side and indicating one form of adhesive level sensing means.
Figure 5:
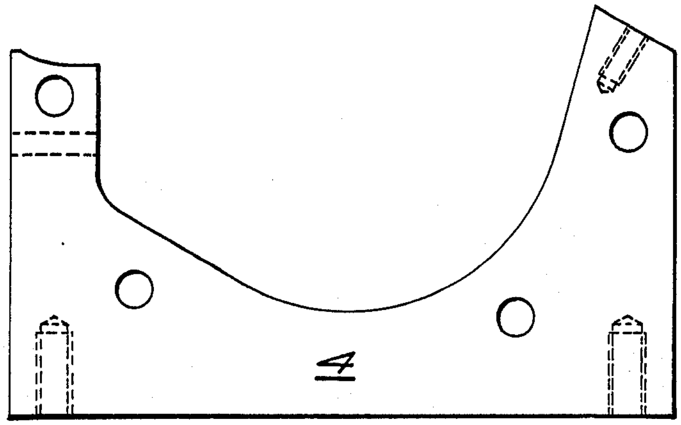
Figure 6:
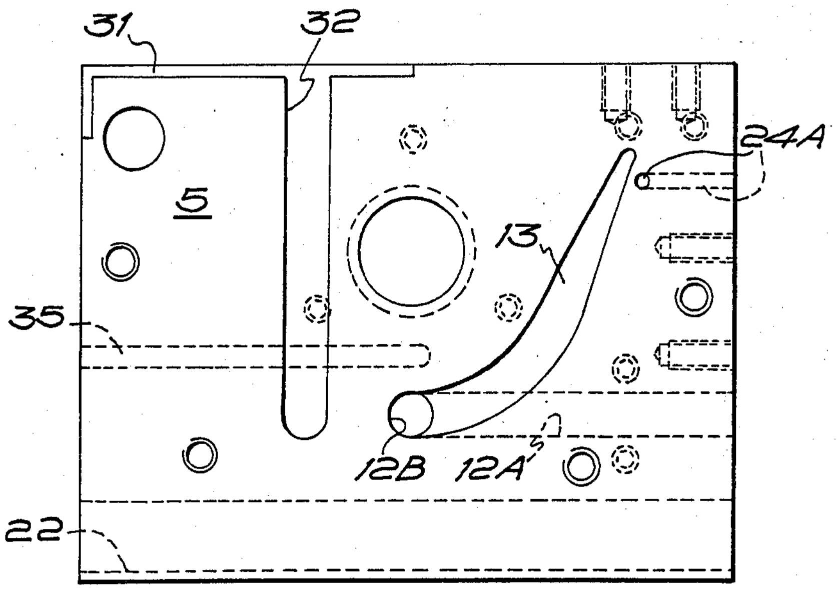

In FIG. 3 the adhesive level sensing means 19 is a float with a diametral hole 54 by which it is guided on a tube 55 depending from a removable cover 56 for the chamber 16, and in which tube is located a proximity switch 15 (e.g., a reed switch) operated by the float and connected to the pump 11.

Figure 7:
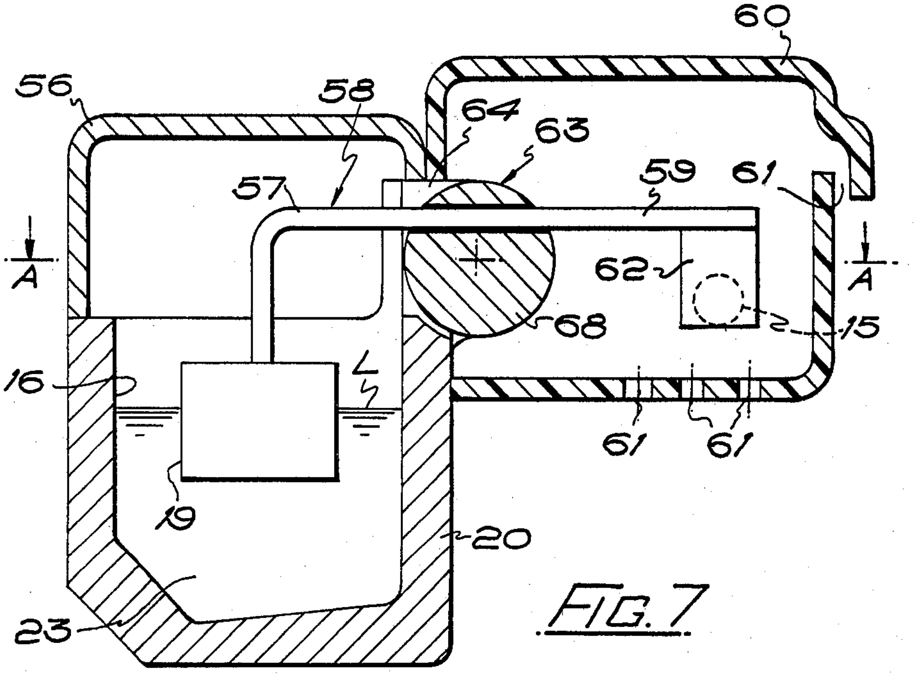
FIG. 7 is a vertical section through an alternative form of adhesive level sensing means.
Figure 8:
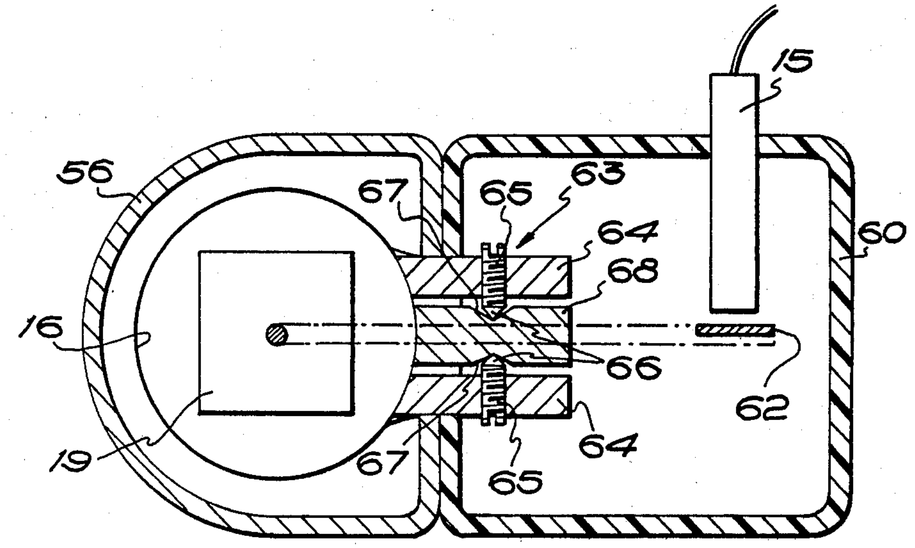
FIG. 8 is a horizontal section taken from the line A—A of FIG. 7.

In FIGS. 7 and 8, a float 19 is mounted on one arm 57 of a lever 58 the other arm 59 of which lies outside the chamber 16 in a separate housing or shroud 60 with venting apertures 61, and which carries a flag 62 movable in relation to an inductive proximity switch 15 in response to movement of the float, and the switch is connected to the pump 11. The pivot 63 for the lever 58 is designed so as to remain unaffected by deposits of adhesive, as it consists of a pair of wings 64 projecting from the body 20 containing the chamber 16 (and thus kept heated with the body 20) and a pair of adjustable spindles 65 with points 66 projecting into conical depressions 67 in a disc 68 carrying the lever 58.

Figure 9:
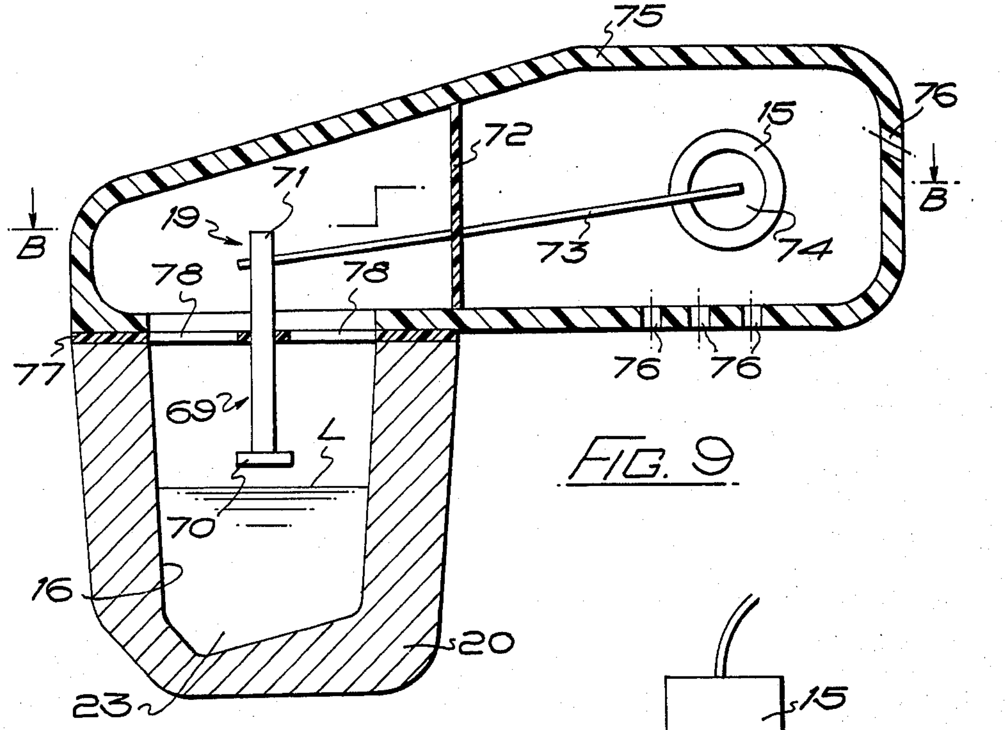
FIG. 9 is a vertical section through one form of adhesive level sensing means without any moving parts.
Figure 10:
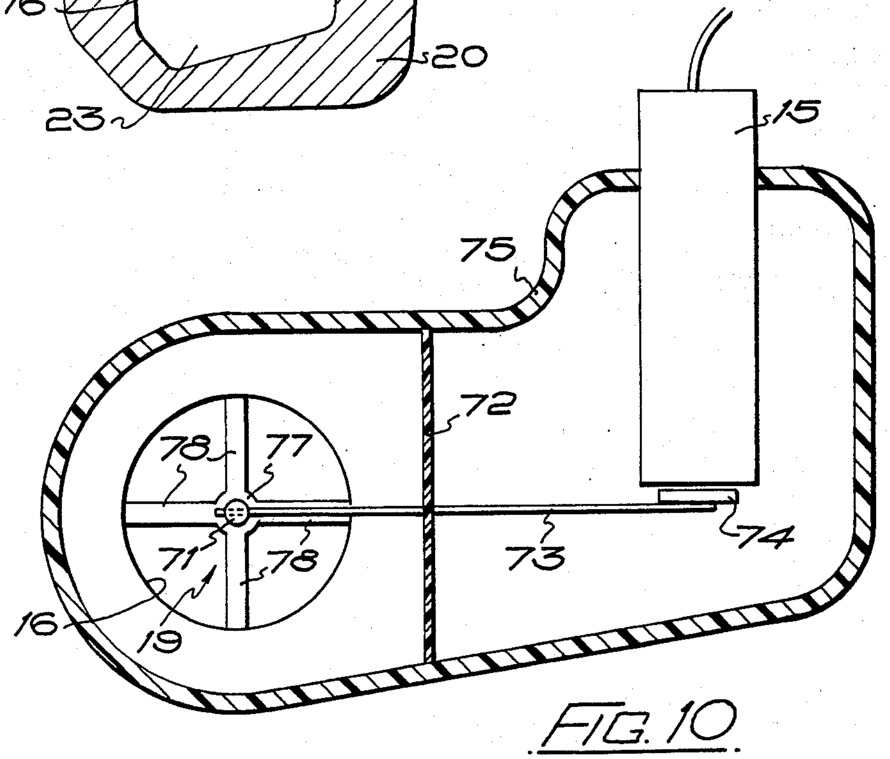
FIG. 10 is a horizontal section taken from the line B—B of FIG. 9.

In FIGS. 9 and 10 the adhesive level sensing means 19 has no moving parts and consists of a field sensor probe 69 with one button end 70 in the chamber 16, the other end 71 being connected outside the chamber through a non-metallic heat shield 72 by a wire 73 (preferably of copper) to a metal field transfer plate 74 adjacent to a capacative proximity switch 15 connected to the pump 11, the switch 15 being mounted in a separate housing or shroud 75 with venting apertures 76. The probe 69 is supported by a non-metallic plate 77 between the chamber body 20 and the shroud 75, with apertures in the plate 77 leaving arms 78 having minimal capacitive effect on the probe. As the level L of the adhesive in the chamber 16 rises the field effect of the adhesive at the button end 70 of the probe increases, this increase being transmitted through the wire 73 to the field transfer plate 74 so as to operate the switch 15 which stops the pump 11.

Figure 11:
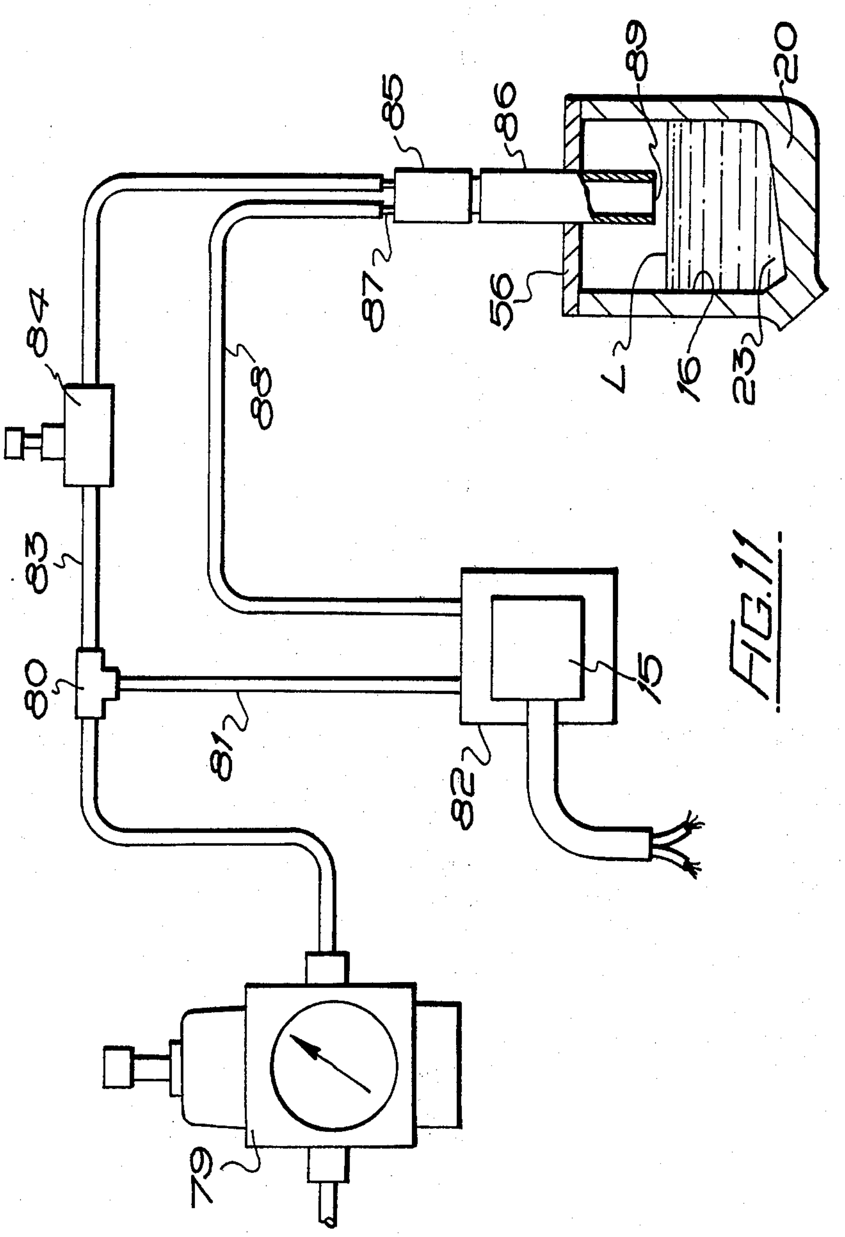
FIG. 11 is a diagrammatic representation of another form of adhesive level sensing means without any moving parts.

In FIG. 11 mains air is supplied, preferably via a high pressure regulator (not shown) to a low pressure regulator 79 the output of which is no greater than 0.25 bar. This output is divided at a T-branch 80 between a pipe 81 to one side of a diaphragm (not shown) a pressure amplifier 82 and a pipe 83 leading via a flow regulator 84 to a back pressure sensor 85 having a dip tube 86 extending into the chamber 16 through the cover 56. A sensing port 87 of the sensor 85 is connected by a pipe 88 to the other side of the diaphragm of the pressure amplifier 82. If the adhesive level L is at a sufficient distance from the lower end 89 of the dip tube 86, then low pressure air escapes from the dip tube and a negative pressure is experienced at the port 87 and is applied (through the pipe 88) to the respective side of the diaphragm of the pressure amplifier 82, and because of the pressure air on the other side (through the pipe 81) the diaphragm is unbalanced and displaced so as to operate a switch (e.g., a reed switch) 15 connected to the pump 11. As the level L rises escape of air from the dip tube 86 becomes restricted (even before the lower end 89 can enter the adhesive), causing a positive pressure to build up at the port 87, which pressure is applied (through the pipe 88) to the respective side of the diaphragm of the pressure amplifier 82 until the diaphragm is moved back so as to de-activate the switch 15 to stop the pump 11. As adhesive is used, the level L drops allowing freer passage for escaping air from the dip tube 86, until the venturi effect of the escaping air again causes a negative pressure at the port 87, when the cycle of activation of the switch 15 and operation of the pump 11 is repeated.

We claim:

1. A hot melt adhesive applicator comprising an enclosed wheel glue pot the sides of which fit closely to the sides of the applicator wheel, a doctor blade preceding the applicator wheel, an anti-stringout wheel following the applicator wheel, a remote tank forming a reservoir for adhesive, a flexible hose from the tank to the glue pot, a pump for feeding adhesive from the tank through the hose, heating means for the tank and hose and glue pot, passages in one side of the glue pot for feeding adhesive from the hose to a pool between the underside of the doctor blade and the periphery of the applicator wheel, and switch means for actuating the pump, there also being provided a chamber between the hose and the passages in the glue pot, with an inlet from the hose and an outlet to the passages in the glue pot, and adhesive level sensing means in the chamber adapted to operate the switch means when the adhesive level in the chamber falls below a predetermined level.

2. A hot melt adhesive applicator as in claim 1, wherein the chamber is provided in a body contiguous with the glue pot.

3. A hot melt adhesive applicator as in claim 1 or claim 2, wherein the outlet from the chamber to the passages in the glue pot is disposed appreciably above the bottom of the chamber, so as to form a sump portion.

4. A hot melt adhesive applicator as in any one of claims 1 or 2, wherein a relief port is provided between the pool in the glue pot and the chamber, above the highest level of adhesive in it.

5. A hot melt adhesive applicator as in any one of claims 1 or 2, wherein the adhesive level sensing means is a float with a diametral hole by which the float is guided on a tube depending from a removable cover for the chamber, and in which tube is located a proximity switch operated by the float and connected to the pump.

6. A hot melt adhesive applicator as in any one of claims 1 or 2, wherein the adhesive level sensing means is a float mounted on one arm of a lever the other arm of which lies outside the chamber and carries a flag movable in relation to an inductive proximity switch in response to movement of the float, which switch is connected to the pump.

7. A hot melt adhesive applicator as in any one of claims 1 or 2, wherein the adhesive level sensing means is a field sensor probe with one end in the chamber, the other end of the probe being connected outside the chamber by a wire to a metal field transfer plate adjacent to a capacative proximity switch connected to the pump.

8. A hot melt adhesive applicator as in any one of claims 1 or 2, wherein the adhesive level sensing means is a dip tube extending into the chamber, with a low pressure and flow air supply to the dip tube and to one side of the diaphragm of a pressure amplifier, and with a sensor port of the pressure sensor probe connected to the other side of the diaphragm, movement of which is caused to actuate a switch connected to the pump.

* * * * *